United States Patent
Sullivan et al.

(10) Patent No.: US 8,610,713 B1
(45) Date of Patent: Dec. 17, 2013

(54) RECONSTITUTING 3D SCENES FOR RETAKES

(75) Inventors: Steve Sullivan, Mill Valley, CA (US); Max S-Han Chen, San Mateo, CA (US); Jeffery Bruce Yost, Mill Valley, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

(21) Appl. No.: 13/530,832

(22) Filed: Jun. 22, 2012

Related U.S. Application Data (63) Continuation of application No. 12/072,425, filed on Feb. 25, 2008, now Pat. No. 8,253,728.

(51) Int. Cl.
G06T 15/00 (2011.01)
G06T 13/00 (2011.01)

(52) U.S. Cl.
USPC .............................. 345/419; 345/473; 345/475

(58) Field of Classification Search
USPC .......................................... 345/419, 473, 475
See application file for complete search history.

(56) References Cited

U.S. PATENT DOCUMENTS

| | | | |
|---|---|---|---|
| 5,148,154 A | | 9/1992 | MacKay et al. |
| 5,218,672 A | * | 6/1993 | Morgan et al. ............... 345/501 |
| 5,307,456 A | | 4/1994 | MacKay |
| 5,692,117 A | | 11/1997 | Berend et al. |
| 5,764,980 A | | 6/1998 | Davis et al. |
| 5,852,435 A | | 12/1998 | Vigneaux et al. |
| 6,351,765 B1 | * | 2/2002 | Pietropaolo et al. .......... 709/218 |
| 6,476,802 B1 | | 11/2002 | Rose et al. |
| 6,493,001 B1 | | 12/2002 | Takagi et al. |
| 6,538,654 B1 | | 3/2003 | Rose et al. |
| 6,570,578 B1 | | 5/2003 | Smirnov et al. |
| 6,664,966 B1 | | 12/2003 | Ibrahim et al. |
| 6,686,918 B1 | | 2/2004 | Cajolet et al. |
| 6,714,201 B1 | | 3/2004 | Grinstein et al. |
| 6,798,407 B1 | | 9/2004 | Benman |
| 6,803,912 B1 | | 10/2004 | Mark et al. |
| 6,856,322 B1 | | 2/2005 | Broadwell et al. |
| 6,873,344 B2 | | 3/2005 | Samra et al. |
| 7,184,059 B1 | | 2/2007 | Fouladi et al. |
| 7,382,378 B2 | | 6/2008 | Levene et al. |
| 7,671,873 B1 | | 3/2010 | Pierini et al. |
| 7,693,867 B2 | | 4/2010 | Jensen et al. |

(Continued)

OTHER PUBLICATIONS

Antics—Product Overview [online]. Antics3D website [retrieved May 5, 2008], 3 pages. Retrieved from Internet at: http://www.antics3d.com/index.php?action=content&content_id=116.

(Continued)

*Primary Examiner* — David T Welch
(74) *Attorney, Agent, or Firm* — Kilpatrick Townsend & Stockton LLP (57) ABSTRACT

In general, one or more aspects of the subject matter described in this specification can include associating with each clip in a sequence of one or more clips a copy of a three dimensional (3D) scene that was used to create the clip, where the clip is a sequence of one or more images that depict the clip's respective 3D scene from the perspective of one or more virtual cameras. Input identifying a clip in the sequence is received. In response to the receiving, a copy of the identified clip's associated copy of the 3D scene is presented in an editor.

20 Claims, 11 Drawing Sheets
(1 of 11 Drawing Sheet(s) Filed in Color)

(56) References Cited

U.S. PATENT DOCUMENTS

| | | | |
|---|---|---|---|
| 7,962,948 B1* | 6/2011 | Girouard et al. | 725/115 |
| 2002/0138843 A1* | 9/2002 | Samaan et al. | 725/87 |
| 2003/0037156 A1 | 2/2003 | Mallart | |
| 2003/0146915 A1 | 8/2003 | Brook et al. | |
| 2004/0027353 A1 | 2/2004 | Saito | |
| 2005/0071306 A1 | 3/2005 | Kruszewski et al. | |
| 2006/0022983 A1 | 2/2006 | Gauthier et al. | |
| 2006/0059426 A1* | 3/2006 | Ogikubo | 715/723 |
| 2009/0087161 A1* | 4/2009 | Roberts et al. | 386/66 |
| 2010/0265250 A1 | 10/2010 | Koenig et al. | |

OTHER PUBLICATIONS

Antics—Tech Specs [online]. Antics3D website [retrieved May 5, 2008], 5 pages. Retrieved from Internet at: http://www.antics3d.com/index.php?action=content&content_id=119.

Autodesk Motionbuilder 7.5, Tackle Your Most Demanding, High-Volume Animation Projects [online], 4 pages. Autodesk website [retrieved on May 5, 2008], . Retrieved from the Internet link appearing at: http://usa.autodesk.com/adsk/servlet/index?siteID=123112&id=6837710.

FrameForge 3D Studio 2, Storyboard Software Storyboarding [online]. Frameforge3d website [retrieved on May 5, 2008], 2 pages. Retrieved from Internet at: http://www.frameforge3d.com/.

FrameForge 3D Studio 2, What's Beyond 2D Storyboarindg?—True 3D Previsualization [online]. Frameforge3d website [retrieved on May 5, 2008], 2 pages. Retrieved from Internet at: http://www.frameforge3d.com/previz-defined.php.

iMovie HD—Getting Started [online]. Apple website [retrieved on May 5, 2008], 83 pages. Retrieved from Internet at: http://manuals.info.apple.com/en/iMovieHD_Getting_Started.pdf.

LightWave v9, go ahead and make a scene. NewTek website [retrieved on May 5, 2008], 6 pages. Retrieved from Internet at: http://www.newtek.com/lightwave/highlights2.php#23.

Realviz to Unveil StoryViz 1.0 at Siggraph 2004 [online]. Digital Producer website [retrieved May 5, 2008], 4 pages. Retrieved from Internet at: http://digitalproducer.digitalmedianet.com/articles/viewarticle.jsp?id=27286&afterinter=true.

UnrealMatinee, the system for keyframing properties over time and creating in-game cinematics [online]. Unreal Technology website [retrieved on May 5, 2008], 1 page. Retrieved from Internet at: http://www.unrealtechnology.com/features.php?ref=matinee.

* cited by examiner

| Clip | Associated 3D Scene |
|---|---|
| 402 — CameraA_take1 | Scene1_A1 |
| CameraA_take2 | Scene1_A2 |
| CameraB_take1 | Scene1_B1 |
| CameraB_take2 | Scene1_B2 |

| Clip | Associated 3D Scene |
|---|---|
| CameraA_take1 | Scene1_A1 |
| CameraA_take2 | Scene1_A2 |
| CameraB_take1 | Scene1_B1 |
| CameraB_take2 | Scene1_B2 |
| 412 — CameraA_take3 | Scene1_A3 |

| Clip | Associated 3D Scene | Parent 3D Scene |
|---|---|---|
| Scene2_Ch1_Take1 | Scene2_Ch1_1 | Scene2 |
| Scene2_Ch2_Take1 | Scene2_Ch2_1 | Scene2 |

| Clip | Associated 3D Scene | Parent 3D Scene |
|---|---|---|
| Scene2_Ch1_Take1 | Scene2_Ch1_1 | Scene2 |
| Scene2_Ch2_Take1 | Scene2_Ch2_1 | Scene2 |
| 608 ～ Scene2_Ch1_Take2 | Scene2_Ch1_2 | Scene2 |

| Clip | Associated 3D Scene | Parent 3D Scene |
|---|---|---|
| Scene2_Ch1_Take1 | Scene2_Ch1_1 | Scene2 |
| Scene2_Ch2_Take1 | Scene2_Ch2_1 | Scene2 |
| Scene2_Ch1_Take2 | Scene2_Ch1_2 | Scene2 |
| 612 ～ Scene2_Ch2_Take2 | Scene2_Ch2_2 | Scene2 |

RECONSTITUTING 3D SCENES FOR RETAKES

CROSS-REFERENCE TO RELATED APPLICATIONS

This application is a continuation of and claims priority under 35 U.S.C. §120 to U.S. application Ser. No. 12/072,425, filed on Feb. 25, 2008, the entire contents of which are hereby incorporated by reference.

BACKGROUND

Figure 1A:
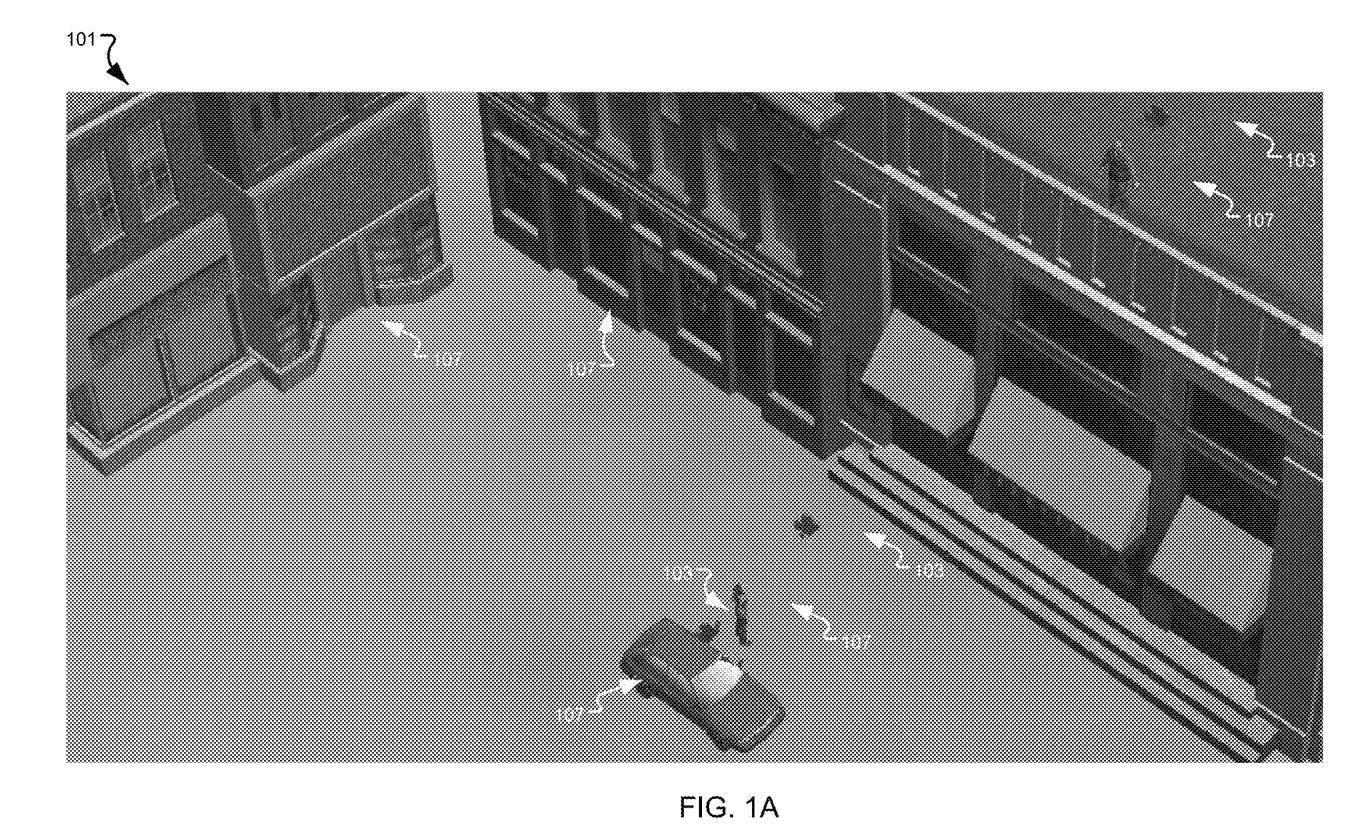
FIG. 1A is an image of an example 3D scene.

Artists and film-makers use 3D computer graphics software to create 3D computer-generated images and animations. Animators use multiple computer programs, including 3D editors and non-linear editors. 3D editors (including 3D modeling, animation, layout, and rendering programs, and the like) allow a user to create and manipulate 3D models—mathematical representations of 3D objects. The user combines 3D models to create a 3D scene 101 (FIG. 1A) that includes an environment, cameras 103, lighting, and props 107. The environment is the setting of a scene, for example, an office, a house or a park. The cameras 103 are virtual cameras—computer simulated cameras that define a perspective or point-of-view to render a 3D scene from. The props 107 are 3D models of objects that are in the scene for a particular shot, for example, people and cars. Some 3D editors allow a user to create an ordered sequence of rendered 2D images of a 3D scene, commonly called a clip or a take.

Once a user has created one or more clips, a non-linear editor allows the user to arrange and modify the clips along a timeline. A user can combine multiple clips to create a time-ordered sequence of clips, commonly called a sequence. The editor is non-linear in the sense that it can randomly access frames or clips within the sequence. Non-linear editors can include other tools, for example, tools to apply video effects such as fading in or out.

Some animators begin animation by creating 3D scenes and shooting (rendering from the point-of-view of a virtual camera) multiple clips of those scenes. Then, when the animator is finished manipulating 3D objects and shooting clips, the clips are combined in a non-linear editor to create sequences and ultimately a finished animation. This creation process is familiar to traditional film directors, who shoot scenes in real life with real cameras and then combine the footage in a non-linear editing environment after all of the filming is done. Sometimes it desirable to modify a 3D scene and re-shoot a clip. However, if the 3D scene has been altered since the time when the clip was shot, it may be difficult or impossible to recreate the scene.

SUMMARY

In general, one or more aspects of the subject matter described in this specification can be embodied in one or more methods that include associating with each clip in a sequence of one or more clips a copy of a three dimensional (3D) scene that was used to create the clip, where the clip is a sequence of one or more images that depict the clip's respective 3D scene from the perspective of one or more virtual cameras. Input identifying a clip in the sequence is received. In response to the receiving, a copy of the identified clip's associated copy of the 3D scene is presented in an editor. Other embodiments of this aspect include corresponding systems, apparatus, and computer program products.

These and other embodiments can optionally include one or more of the following features. A copy of a 3D scene can comprise one or more of asset path data and references to assets. A modified 3D scene can be obtained, where the modified 3D scene is based on the identified clip's respective 3D scene. A new clip can be created based on the modified 3D scene. A copy of the modified 3D scene can be associated with the new clip. The new clip can be associated with the identified clip. A modified 3D scene can include receiving input modifying the copy of the identified clip's associated copy of the 3D scene. One or more clips are identified that are related to the identified clip and copies of the related clips' respective 3D scenes are modified according to the modifying input. The input can modify attributes of one or more of assets or asset path data. A modified 3D scene can be obtained, where the modified 3D scene is based on the identified clip's respective scene; and modifying the identified clip reflects modifications to the 3D scene. Clips in a sequence are time-ordered and can overlap in time.

Particular embodiments of the invention can be implemented to realize one or more of the following advantages. While viewing a sequence of clips in a non-linear editor, a user can select a clip, reconstitute the 3D scene that was used to create the clip, and then alter the scene and shoot a new take of the scene. The user can do this without actively keeping track of 3D scenes and searching for the original 3D scene. Additionally, changes made to a 3D scene can optionally be automatically propagated to other clips that are related to that 3D scene.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1B:
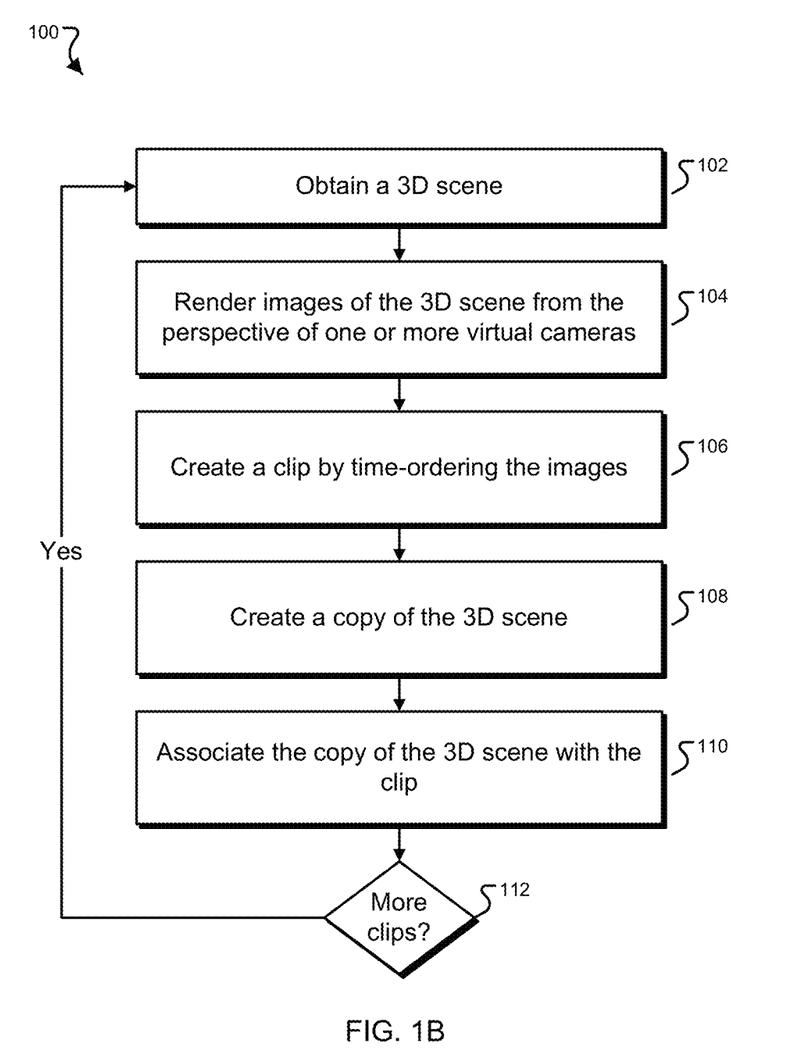
FIGS. 1B and 1C illustrate techniques for generating and editing 3D animations.

FIG. 1B illustrates a technique 100 for generating clips of 3D animations and associating copies of 3D scenes with the clips. A 3D scene is obtained (step 102). For example, user input is received that specifies the location of an electronic file containing the desired 3D scene, and then the desired 3D scene is presented in a 3D editor. Alternatively, a set of scenes can be automatically searched for a scene matching certain criteria (e.g., scenes created on a certain date, by a certain animator, within a specified range of file sizes, and so on), or through other methods, for instance. In a further alternative, a new 3D scene is created.

The 3D scene specifies the location and properties of 3D models within 3D space. In some implementations, the 3D scene includes references to assets (which are 3D models, virtual cameras, lighting, and the like) and asset path data. In various implementations, definitions of assets and path data can be stored separately from a 3D scene (e.g., in one or more files), such that the 3D scene can refer to them and provide their locations in a scene. For example, a 3D scene can include the information that a dog is located in the center of the scene. It does not have to include detailed information on the properties of the dog (e.g., its dimensions, appearance, facial expressions, and so on) because that information is stored in a separate asset file.

The asset path data specifies the motion of assets in the 3D scene over time. In some implementations, the asset path data is keyframe animation data. A keyframe indicates the positions of assets at a point in time. For example, one keyframe shows a virtual character's hand reaching for a gun, and a later keyframe shows the character's hand holding the gun. The location of the assets at points in time between keyframes is interpolated to produce a smooth animation. Alternatively, the asset path data is momentum information and constraint data for inverse kinematic animation, forward kinematic animation, or similar animation techniques. In further implementations, the asset path data is other data that can be used to determine motion within a 3D scene.

A 3D scene is rendered from the perspective of one or more virtual cameras (step 104). By way of illustration, one or more rendering techniques are used to produce rendered images—for example, ray tracing, ray casting, and scanline rendering. Hardware acceleration can be used to perform some or all of the rendering. A clip is created by time-ordering the rendered images (step 106). Alternatively, a clip is created without time-ordering the images (step 106). In general, the images are rendered in the desired time order. A clip can be stored in an electronic video file, for example, an Audio Video Interleave (AVI) file, a Motion Picture Experts Group (MPEG) file, or a proprietary video formatted file. Alternatively, images that make up a clip can be individually stored as JPG files, for instance. Other storage formats are possible.

A copy of the 3D scene used to create the clip is then created (step 108). The copy of the 3D scene includes information that allows the clip to be recreated. In various implementations, the copy of the 3D scene is stored in one or more electronic files that include references to assets and asset path data. By way of illustration, a copy of a 3D scene can be stored in the 3D Data Exchange Format (FBX), or in a proprietary file format such as one that minimizes the amount of data in the file.

Figure 4A:
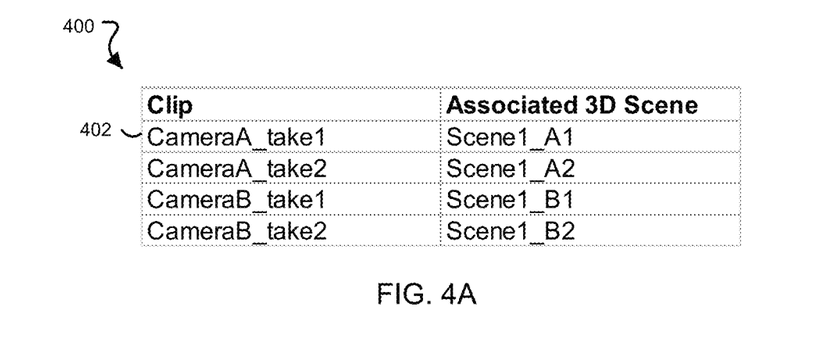
FIGS. 4A and 4B show example tables for keeping track of clip and 3D scene associations.
Figure 4B:
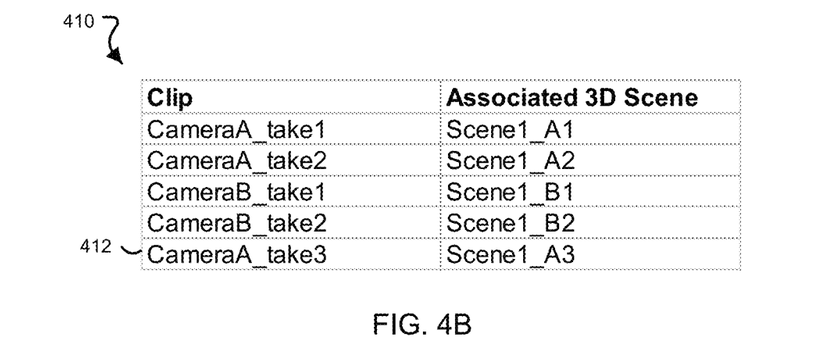

The 3D scene is then associated with the clip (step 110). In some implementations, the electronic file management is used to associate a file containing the copy of the 3D scene with a file containing the clip. For example, the files for the clip and the associated 3D scene can be stored in a single folder, or a unique identifier can be included into the file name of each file. Alternatively, a table is built that contains a reference to each clip and each copy of a 3D scene. The table specifies which clip is associated with which copy of a 3D scene. FIGS. 4A and 4B are examples of such a table and will be discussed further below. In a further alternative, the clip and the 3D scene are combined into a single file. Other ways of persisting the association are possible.

In some implementations, each clip and each copy of a 3D scene are organized using a version control system. Version control systems are commonly used in software development to keep track of ongoing development of source code. In a typical version control system, changes to files are denoted by incrementing an associated number or letter code called the revision number. For example, each file containing a clip can be named according to the 3D scene used to generate that clip, the virtual camera used to generate the clip, and the number of clips previously generated of that 3D scene from that virtual camera. An example file name in this version control system is "SceneII_CameraA_Take3," where SceneII is the name of the 3D scene that generated the clip, CameraA is the identifier for the virtual camera used to generated the clip, and Take3 indicates that two previous clips were generated of this 3D scene using CameraA. The example is illustrated in FIGS. 3A and 3B will be discussed further below. In more sophisticated version control systems, the system keeps track of additional information, for example, the name of the user who generated the clip, the date the clip was created, the rendering technique or engine used to render the images in the clip, and the like.

It is then determined whether more clips should be generated (step 112). In general, user input specifying whether the user wishes to shoot additional takes of the same 3D scene, shoot takes of a different scene, or is finished editing 3D scenes and wishes to edit video clips is accepted. Clips are generated and associates 3D scenes with those clips until no more clips are desired (repeat steps 102-112).

Figure 1C:
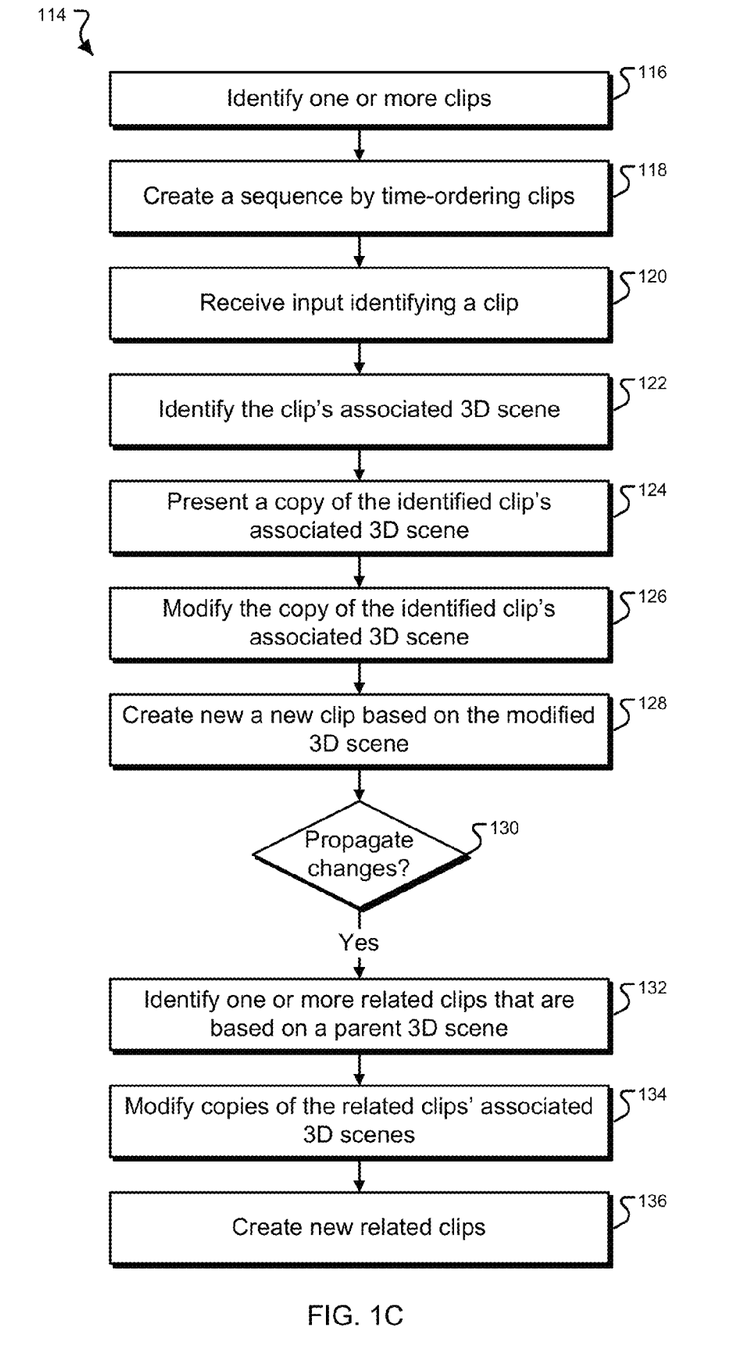

FIG. 1C shows a technique 114 for editing a 3D scene associated with a clip. One or more clips are identified (step 116). User input can be received to identify clips generated according to the technique shown in FIG. 1B, for example. Clips can also be obtained from other sources, e.g., from a digital video camera. A sequence is then created by time-ordering at least two of the clips (step 118). In various implementations, a visual timeline is presented in a graphical user interface (GUI) for a non-linear editing environment, and the user arranges clips along the timeline to create the sequence.

Figure 2A:
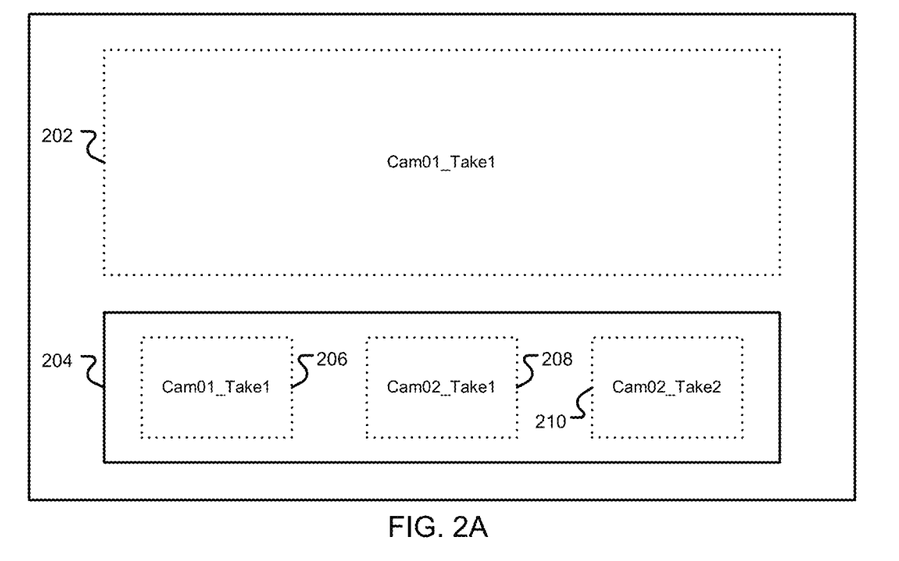
FIGS. 2A and 2B show example user interfaces for a non-linear editor.

For example, in some implementations, the system presents a GUI similar to that shown in FIG. 2A for previewing clips in a non-linear editor. The GUI includes an area 204 that shows clip names or thumbnails of clips 206, 208 and 210. The user can select a clip which will cause the clip to be played (or paused) in area 202. Using this GUI, the user locates clips to include in the sequence. Alternatively, the editor presents the user with a GUI similar to that shown in FIG. 2B, which shows another example GUI for arranging clips on a timeline in a non-linear editor. The GUI includes a timeline 216 and an area 214 for arranging clips 218, 220, and 222 on the timeline. The user can select a clip in the timeline which will cause a preview of the clip in a preview area 212.

Figure 2B:
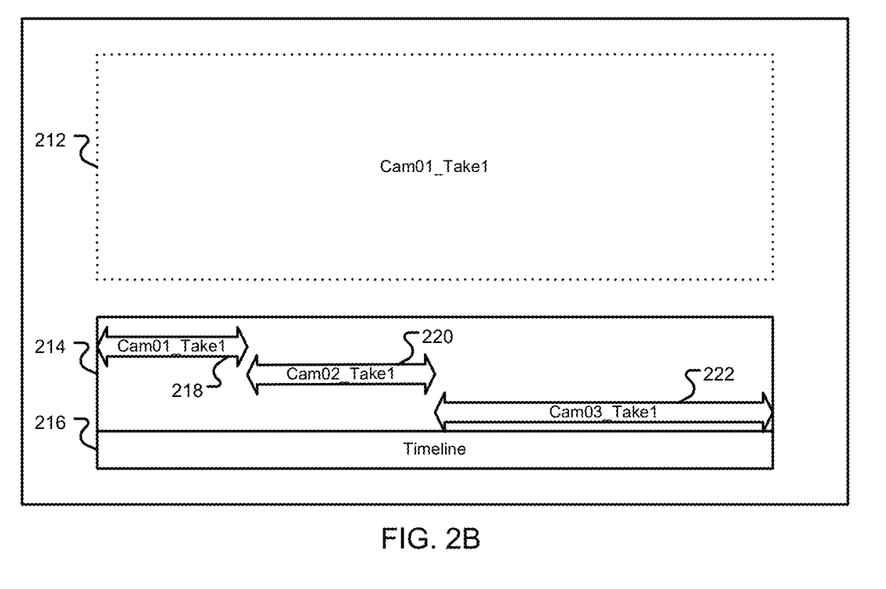

Referring again to FIG. 1C, input identifying a clip is received (step 120). For example, such input can be provided through a GUI in a non-linear editor, e.g., a GUI as shown in FIGS. 2A and 2B. The input specifies that the user wants to make changes to the clip by modifying a copy of the 3D scene used to generate the clip and then re-shoot the clip. For example, a user might select a clip and then push a button that says, "New Take," or select the command "New Take" from a menu that pops up over a selected clip.

The selected clip's associated 3D scene is identified (step 122). In the case where the clip and its associated scene share a unique identifier in their file names, a directory of files can be searched for a 3D scene named with the unique identifier in the clip's file name. By way of illustration, in the case where associations between clips and 3D scenes are maintained in a table, the clip can be looked up in the table to yield the corresponding 3D scene.

A copy of the identified clip's associated copy of the 3D scene is then presented in a 3D scene editor (step 124). Alternatively, the identified clip's associated copy of the 3D scene is presented in the 3D scene editor (step 124). In some implementations, the 3D editor is integrated into a single program with the non-linear editing environment. In other implementations, the scene editor is a separate application. The identified clip's associated copy of the 3D scene, or a copy thereof, can then be modified (step 126). User input can modify the scene in a 3D scene editor. For example, the user may change the view of a virtual camera, the color or shading of an asset, or asset path data for an asset in the 3D scene.

One or more new clips are created based on the modified 3D scene (step 128). In some implementations, the technique described in steps 104-110 of FIG. 1B is used to create each new clip, so that each new clip has its own associated copy of the modified 3D scene. In some implementations, the new clips are organized according to a version control system as described above. Alternatively, the identified clip is automatically re-shot to integrate modifications to the 3D scene.

A determination is then made as to whether to propagate the modifications made to the identified clip's associated copy of the 3D scene to related clips (step 130). Two clips are related if they are associated with the same 3D scene. By way of illustration, if two clips are created from the same 3D scene, the clips are related. Alternatively, two clips are related if they are associated with similar 3D scenes, such as scenes that have one or more assets in common. In yet a further alternative, two clips are related if they are associated with 3D scenes ("child scenes") that were derived through modifications of a common ancestor 3D scene ("parent scene"). In some implementations, a data structure indicating parent-child relationships between scenes is maintained. A user can be prompted to propagate the modifications or the propagation can be automatic. If the determination is affirmative, one or more related clips are identified (step 132).

In some implementations, each 3D scene is associated with information pertaining to its parent scene, if any, and its child scenes, if any. In this case, the identified clip's associated scene is examined to see if it identifies a parent scene. If it has a parent scene, the parent scene is examined to see if it identifies any other child scenes. In further implementations, other methods are used to keep track of relationships between scenes and identify related clips.

In some implementations, a user is presented with a menu of the related clips—their names, thumbnails, or other identifying information. The input is received from the user indicating which related clips should be modified. In other implementations, changes are propagated to all related clips.

Copies of the related clips' associated copies of 3D scenes are then modified based on the modified 3D scene (step 134). Alternatively, the related clips' associated copies of 3D scenes are modified (step 134). For example, if a user modified the identified clip's associated 3D scene by adding a tree to it, then the same tree is added in the same location to each related clip's associated 3D scene. In various implementations, propagation of modifications from the identified clip's 3D scene to related 3D scenes occurs only for those assets the scenes have in common. In further implementations, modifications to assets in the identified clip's 3D scene result in creation of the modified asset in related 3D scenes if the asset does not exist in the related 3D scenes. Other ways of propagating changes are possible.

New related clips are then created (step 136). In some implementations, the related clips are automatically re-shot using the related clips' modified 3D scenes. In general, the system performs the method shown in steps 104-110 of FIG. 1B to create each new clip, so that each new clip has its own associated copy of the 3D scene used to generate it.

Figure 3:
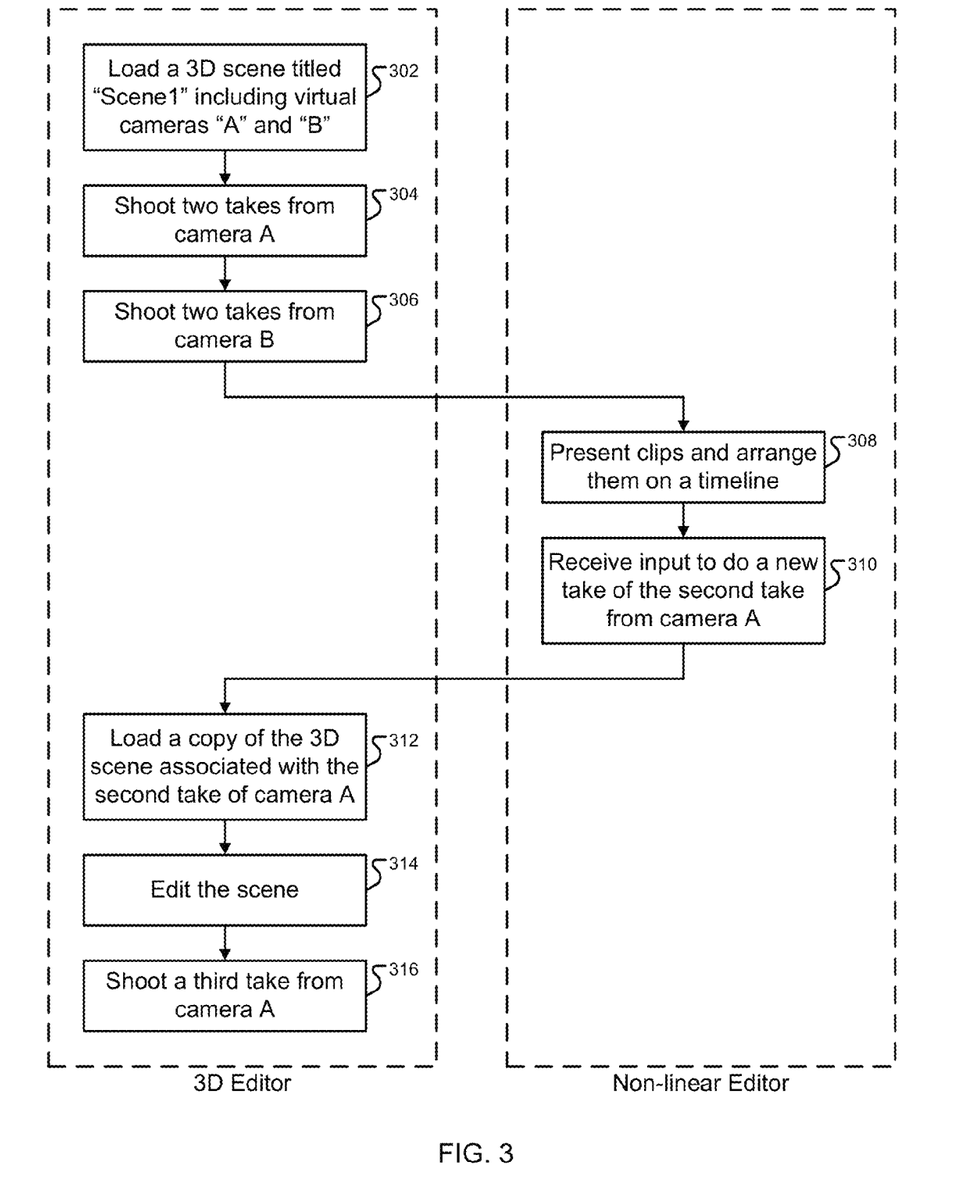
FIG. 3 shows an example technique for generating and editing an animation.

FIG. 3 shows an example technique for generating and editing an animation. In particular, the example technique shown in FIG. 3 illustrates the use of a file naming convention and one way of associating clips and 3D scenes by keeping track of them in a table. Example tables 400 and 410 are shown in FIGS. 4A and 4B.

For convenience, the method will be described with respect to a system (e.g., system 700) that performs the method. In this example, the system performs all of the steps shown at the direction of an animator who specifies what scenes to load, how many takes to shoot, and other artistic direction. The system, using a 3D editor, loads a 3D scene titled "Scene1" that includes two virtual cameras, camera "A" and camera "B" (step 302). First, the system shoots two takes from camera A, following steps 104-110 in FIG. 1B (step 304). Then, the system shoots two takes from camera B, again following steps 104-110 in FIG. 1B (step 306).

FIG. 4A shows a table 400 of the clips generated up to this point and the 3D scenes associated with them. For example, the first row 402 in the table 400 shows that the first clip from camera A, titled "CameraA_take1," is associated with a copy of the 3D scene used to generate the clip, titled "Scene1_A1." Referring back to FIG. 3, the system, using a non-linear editor, presents clips and arranges them on a timeline to generate a sequence (step 308). The system receives input that the animator wants to do a new take of the second take from camera A, which was called "CameraA_take2" (step 310). The system determines that the scene titled "Scene1_A2" is associated with the clip "CameraA_take2" and loads a copy of that scene in a 3D editor (step 312). The system edits the scene as desired by the animator (step 314). The system then shoots a third take from camera A (step 316) as directed by a user or automatically.

FIG. 4B shows a table 410 of the clips generated at this point and the 3D scenes associated with them. The last row 412 in the table 410 shows that the new take, titled "CameraA_take3," is associated with the 3D scene "Scene1_A3."

Figure 5A:
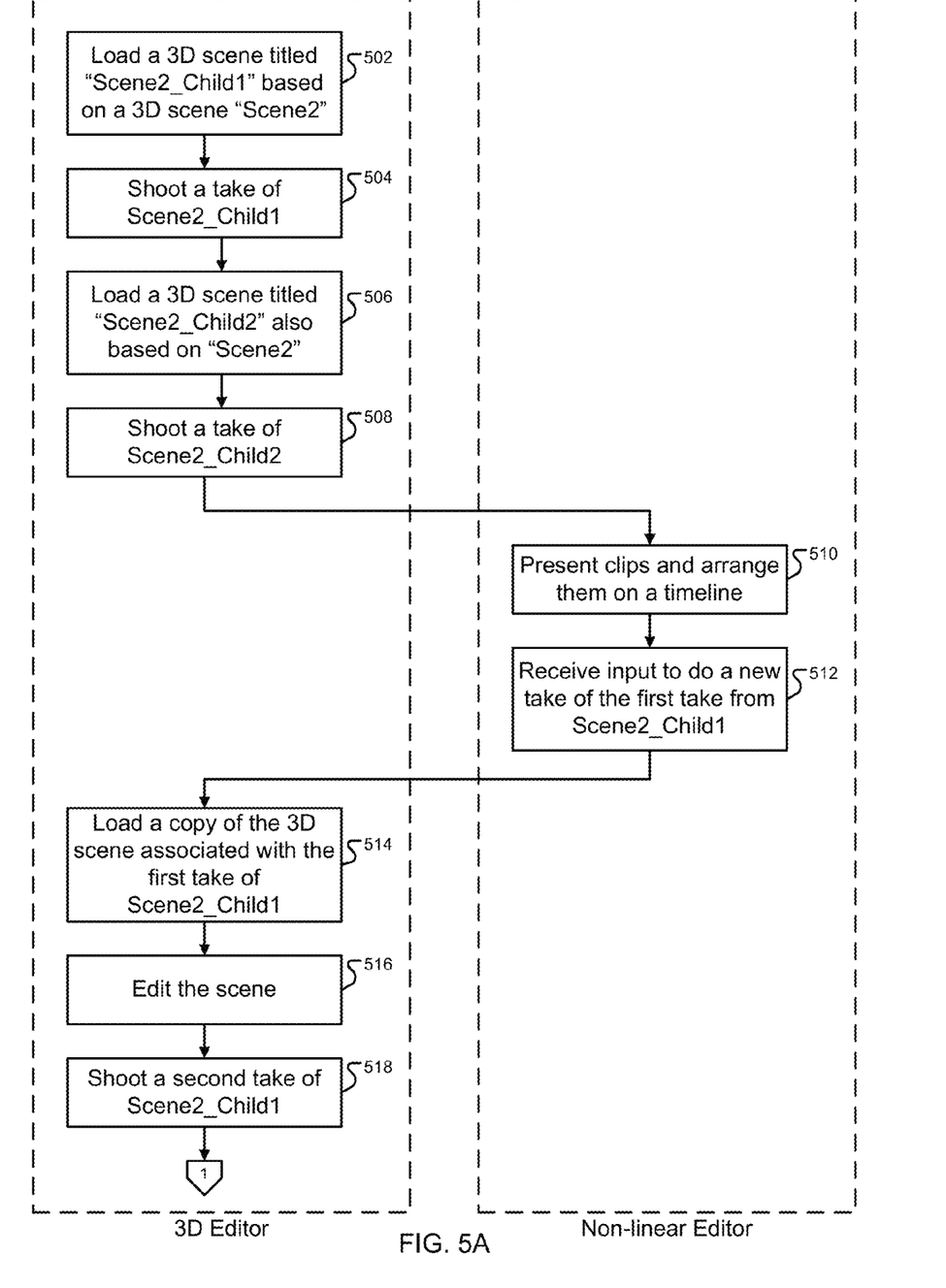
FIGS. 5A and 5B show an example technique for generating and editing an animation.
Figure 5B:
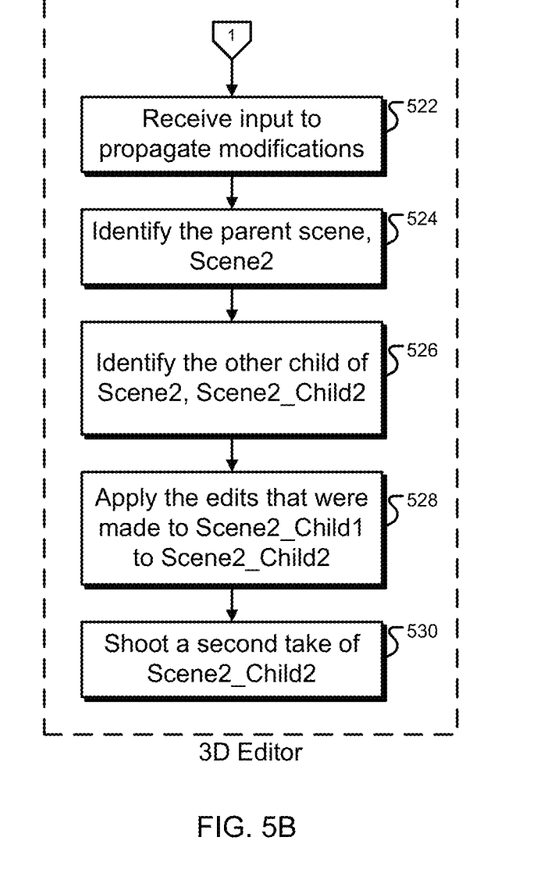
Figure 6A:
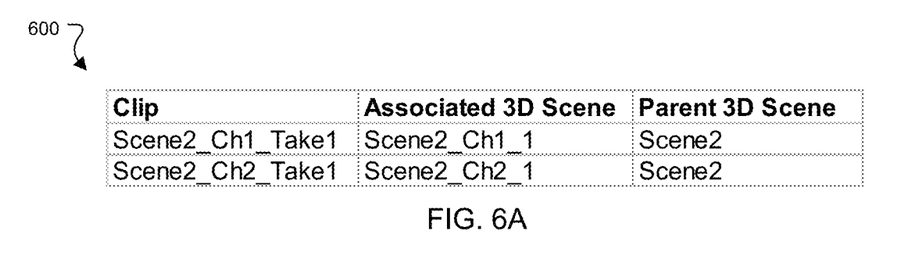
FIGS. 6A, 6B, and 6C show example tables for keeping track of clip and 3D scene associations.
Figure 6B:
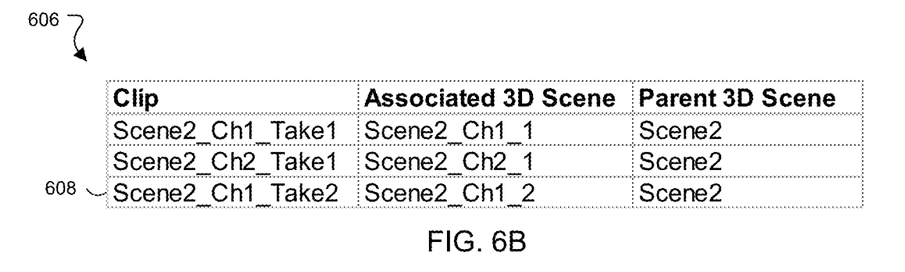
Figure 6C:
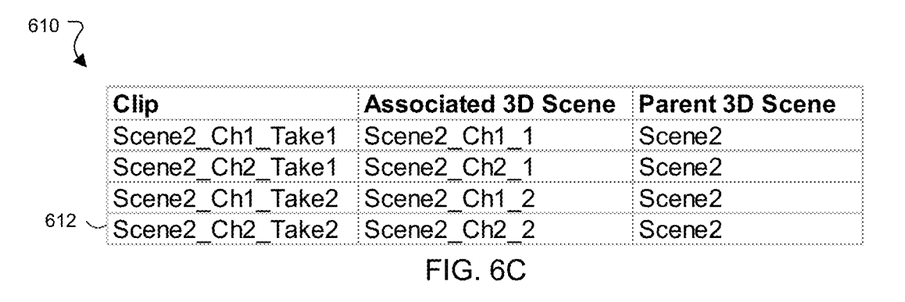

FIGS. 5A and 5B show an example technique for generating and editing an animation. In particular, the example method shown in FIGS. 5A and 5B shows propagation of changes to related clips. The tables 600, 606 and 610 shown in FIGS. 6A, 6B, and 6C show the clips generated during the performance of the method and the 3D scenes associated with them. For convenience, the technique will be described with respect to a system (e.g., system 700) that performs the method. In this example, the system performs all of the steps shown at the direction of an animator who specifies what scenes to load, how many takes to shoot, and other artistic direction.

The system, using a 3D editor, loads a 3D scene titled "Scene2_Child1" that is based on a 3D scene called "Scene2" (step 502). The system shoots a take of Scene2_Child1, following steps 104-110 in FIG. 1B (step 504). The system then loads another 3D scene based on Scene2, called "Scene2_Child2" (step 506). The system shoots a take of Scene2_Child2, again following steps 104-110 in FIG. 1B (step 508).

FIG. 6A shows a table 600 of the clips generated at this point and the 3D scenes associated with them. The table 600 also shows that the associated 3D scenes are based on Scene2, their parent 3D scene.

Referring back to FIG. 5A, the system, using a non-linear editor, presents the clips and arranges them on a timeline (step 510). The system receives input that the animator wants to do a new take of the first take from Scene2_Child1, called "Scene2_Ch1_Take1" (step 512).

The system determines that the scene titled "Scene2_Child1__1" is associated with the clip Scene2_Ch1_Take1 and loads a copy of that scene in a 3D editor (step 514). The system edits the scene as desired by the animator (step 516). The system shoots a second take of Scene2_Child1, following steps 104-110 in FIG. 1B (step 518).

FIG. 6B shows a table 606 of the clips generated at this point and the 3D scenes associated with them. As shown in the last row 608 of the table 606, the second take of Scene2_Child1 is called "Scene2_Ch1_Take2," and it is associated with a copy of the 3D scene used to generate it, called "Scene2_Child1__2." Its parent 3D scene is Scene2. Alternatively, in a situation like this, the system can consider Scene2_Child1__1 to be the parent scene.

Referring to FIG. 5B, the system receives input that the animator wishes to propagate the modifications that he made to Scene2_Child1__1 to related clips (step 522). The system identifies the parent scene, Scene2 (step 524). The system identifies the other child of Scene2, Scene2_Child2 (step 526). The system applies the edits that were made to Scene2_Child1 to Scene2_Child2 or a copy thereof (step 528). The system shoots a second take of Scene2_Child2, following steps 104-110 in FIG. 1B (step 530).

FIG. 6C shows a table 610 of the clips generated at this point and the 3D scenes associated with them. The last row 612 in the table 610 shows the clip that was generated by propagating edits to related clips, Scene2_Ch2_Take2, and its associated 3D scene, Scene2_Child2__2.

Figure 7:
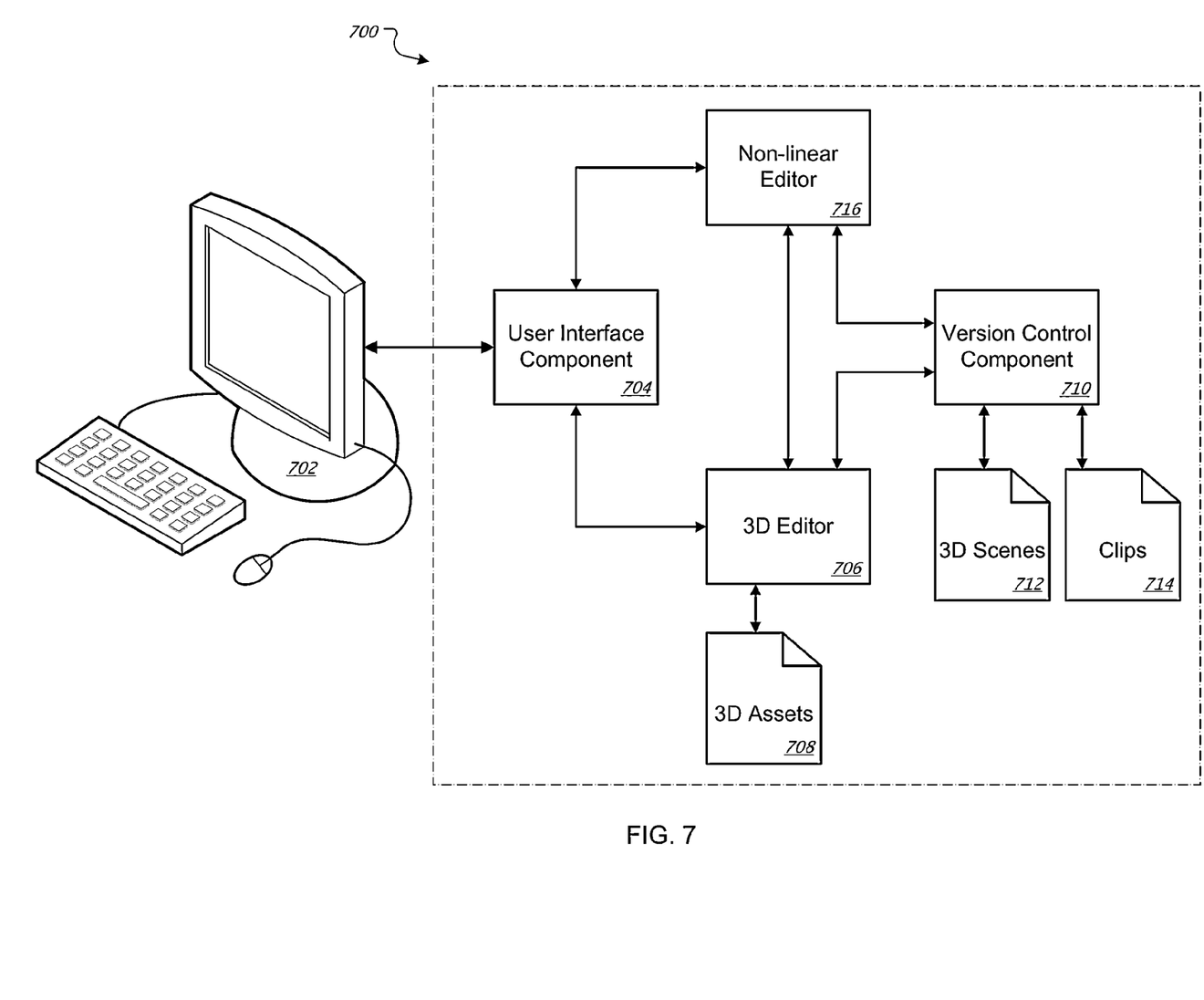
FIG. 7 shows an example system for generating and editing 3D animations.

FIG. 7 shows a system 700 for generating and editing 3D animations. Although several components are illustrated, there may be fewer or more components in the system 700. Moreover, the components can be distributed on one or more computing devices connected by one or more networks or other suitable communication means.

A user interacts with the system 700 through a computer 702 or other device. In particular, the user interacts with a user interface component 704 that provides an interface to a 3D editor 706 or a non-linear editor 716 or both. The user operates the 3D editor 706 to create 3D scenes that contain 3D assets 708. The 3D editor renders clips of the 3D scenes, and then associates the clips with copies of the 3D scenes used to generate them. The version control component 710 stores copies of 3D scenes 712 and clips 714 according to a scheme that specifies information about the scenes and clips, e.g., which virtual camera was used to render the clip, how many other takes had been previously rendered, which rendering technique was used, and so on.

The non-linear editor 716 allows the user to randomly access clips and images within the clips. The non-linear editor 716 accesses clips through the version control component 710. The user operates the non-linear editor 716 to arrange clips along a timeline. While reviewing clips and arranging them along a timeline, the user can indicate that he wants to do a new take of a certain clip. The non-linear editor 716 passes information about the clip to the 3D editor 706, which presents the 3D scene associated with the clip. The user then makes modifications in the 3D editor 706 and shoots a new clip. The user operates the 3D editor 706 and the non-linear editor 716 in this manner until the animation, which consists of the clips arranged on the timeline, is complete.

Figure 8:
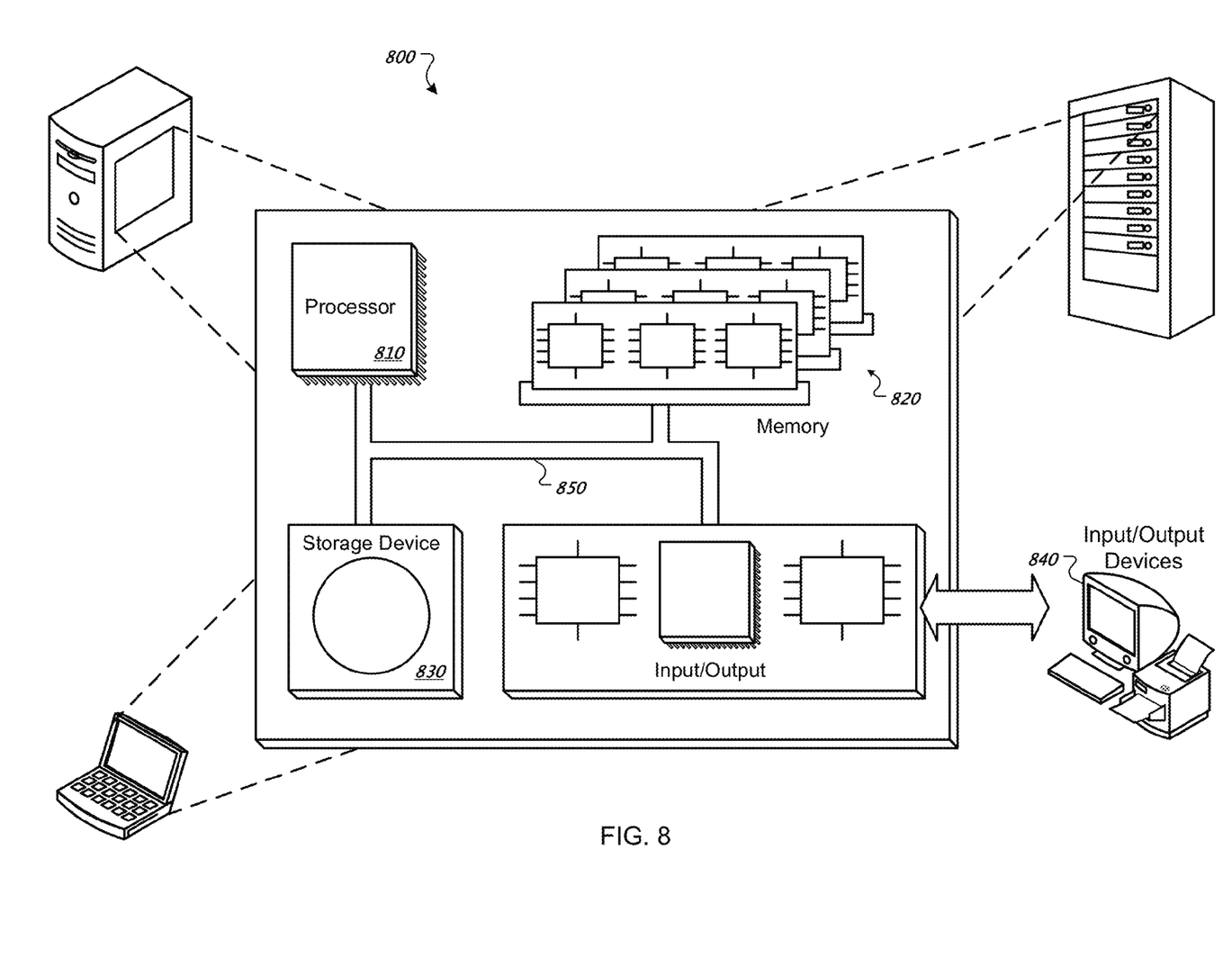
FIG. 8 is a schematic diagram of a generic computer system.

FIG. 8 is a schematic diagram of a generic computer system 800. The system 800 can be used for practicing operations described in association with the techniques 100 and 114, for example. The system 800 can include a processor 810, a memory 820, a storage device 830, and input/output devices 840. Each of the components 810, 820, 830, and 840 are interconnected using a system bus 850. The processor 810 is capable of processing instructions for execution within the system 800. Such executed instructions can implement one or more components of system 700, for example. The processor 810 is single-threaded or multi-threaded, having one or more processor cores. The processor 810 is capable of processing instructions stored in the memory 820 or on the storage device 830 to display graphical information for a user interface on the input/output device 840.

The memory 820 is a computer readable medium such as volatile or non volatile random access memory that stores information within the system 800. The memory 820 could store data structures representing clips and 3D scenes, for example. The storage device 830 is capable of providing persistent storage for the system 700. The storage device 830 may be a floppy disk device, a hard disk device, an optical disk device, or a tape device, or other suitable persistent storage means. The input/output device 840 provides input/output operations for the system 700. In one implementation, the input/output device 840 includes a keyboard and/or pointing device. In another implementation, the input/output device 840 includes a display unit for displaying graphical user interfaces.

The input/output device 840 can provide input/output operations for a 3D animation system, e.g., system 700. The 3D animation system can include computer software components for 3D editing and non-linear editing. Examples of such software components include the user interface component 704, the 3D editor 706, the version control component 710, and the non-linear editor 716. Such software components 704, 706, 710 and 716 can be persisted in storage device 630, memory 620 or can be obtained over a network connection, to name a few examples.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desired results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve the desired results.

What is claimed is:

1. A computer-implemented method, comprising:
maintaining, in at least one computer-readable medium, for each clip in a sequence of one or more clips, a user identifier and a first copy of a three dimensional (3D) scene that was used to create the clip, where the clip is a sequence of one or more images that depict the clip's respective 3D scene and where each user identifier specifies a respective user who generated the clip;
receiving input that indicates a particular user;
identifying, in response to the receiving, a clip that has a user identifier that corresponds to the indicated user;
in response to the identifying, generating and presenting a second copy of the identified clip's associated first copy of the 3D scene in an editor;
modifying the second copy of the identified clip's associated 3D scene;
creating a new clip using the modified second copy of the 3D scene;
determining a related clip associated with the identified clip;
receiving an input to propagate modifications made to the second copy of the identified clip's associated 3D scene to the related clip;

in response to receiving the input to propagate modifications, creating a new related clip using the modified second copy of the 3D scene, wherein the new related clip includes images that depict the propagated modifications; and maintaining, in the at least one computer-readable medium, the new related clip in association with the modified second copy of the 3D scene.

2. The method of claim 1, wherein the input is received from a different user than the indicated user.

3. The method of claim 1, wherein clips, user identifiers, and copies of 3D scenes are maintained in a version control system.

4. The method of claim 1, wherein the 3D scene includes a 3D environment, one or more assets in the 3D environment, and an animation path defining movement of the asset in the 3D environment over time.

5. The method of claim 1, further including:
determining a new user identifier for the new clip, wherein the user identifier is different than the new user identifier value.

6. The method of claim 5, further comprising outputting the new clip.

7. The method of claim 5, further comprising outputting the modified second copy of the 3D scene.

8. The method of claim 1, further comprising outputting the identified clip.

9. The method of claim 1, further comprising outputting the identified clip's associated copy of the 3D scene.

10. The method of claim 1, wherein the editor is a 3D editor.

11. The method of claim 10, wherein the input that identifies the particular user is received in a non-linear editor.

12. A system comprising:
one or more processors; and
a computer readable medium having stored therein instructions that, when executed by the one or more processors, generate an animation system configured to:
maintain, in at least one computer-readable medium, for each clip in a sequence of one or more clips, a user identifier and a first copy of a three dimensional (3D) scene that was used to create the clip, where the clip is a sequence of one or more images that depict the clip's respective 3D scene and where each user identifier specifies a respective user who generated the clip;
receive input that indicates a particular user;
identify, in response to the receiving, a clip that has a user identifier that corresponds to the indicated user;
in response to the identifying, generate and present a second copy of the identified clip's associated first copy of the 3D scene in an editor;
modify the second copy of the identified clip's associated 3D scene;
create a new clip using the modified second copy of the 3D scene;
determine a related clip associated with the identified clip;
receive an input to propagate modifications made to the second copy of the identified clip's associated 3D scene to the related clip;
in response to receiving the input to propagate modifications, create a new related clip using the modified second copy of the 3D scene, wherein the new related clip includes images that depict the propagated modifications; and
maintain, in the at least one computer-readable medium, the new related clip in association with the modified second copy of the 3D scene.

13. The system of claim 12, wherein the input is received from a different user than the indicated user.

14. The system of claim 12, wherein clips, user identifiers, and copies of 3D scenes are maintained in a version control system.

15. The system of claim 12, wherein the 3D scene includes a 3D environment, one or more assets in the 3D environment, and an animation path defining movement of the asset in the 3D environment over time.

16. The system of claim 12, wherein the animation system is further configured to:
determine a new user identifier for the new clip, wherein the user identifier is different than the new user identifier value.

17. A non-transitory computer-readable medium having stored therein instructions that, when executed, perform a method comprising:
maintaining, in at least one computer-readable medium, for each clip in a sequence of one or more clips, a user identifier and a first copy of a three dimensional (3D) scene that was used to create the clip, where the clip is a sequence of one or more images that depict the clip's respective 3D scene and where each user identifier specifies a respective user who generated the clip;
receiving input that indicates a particular user;
identifying, in response to the receiving, a clip that has a user identifier that corresponds to the indicated user;
in response to the identifying, generating and presenting a second copy of the identified clip's associated first copy of the 3D scene in an editor;
modifying the second copy of the identified clip's associated 3D scene;
creating a new clip using the modified second copy of the 3D scene;
determining a related clip associated with the identified clip;
receiving an input to propagate modifications made to the second copy of the identified clip's associated 3D scene to the related clip;
in response to receiving the input to propagate modifications, creating a new related clip using the modified second copy of the 3D scene, wherein the new related clip includes images that depict the propagated modifications; and
maintaining, in the at least one computer-readable medium, the new related clip in association with the modified second copy of the 3D scene.

18. The computer-readable medium of claim 17, wherein the input is received from a different user than the indicated user.

19. The computer-readable medium of claim 17, wherein clips, user identifiers, and copies of 3D scenes are maintained in a version control system.

20. The computer-readable medium of claim 17, wherein the 3D scene includes a 3D environment, one or more assets in the 3D environment, and an animation path defining movement of the asset in the 3D environment over time.

* * * * *